US005863014A

United States Patent [19]
Standish

[11] Patent Number: 5,863,014
[45] Date of Patent: Jan. 26, 1999

[54] THRUST REVERSER FOR HIGH BYPASS FAN ENGINE

[75] Inventor: Robert R. Standish, Gazeran, France

[73] Assignee: Societe de Construction des Avions Hurel-Dubois, Meudon-la-Foret, France

[21] Appl. No.: 837,343

[22] Filed: Apr. 17, 1997

[30] Foreign Application Priority Data

Dec. 19, 1996 [EP] European Pat. Off. ............. 96 402822

[51] Int. Cl.[6] ............................ F02K 1/72

[52] U.S. Cl. ................. 244/110 B; 239/265.29; 239/265.31; 60/226.2; 60/232

[58] Field of Search .............. 244/110 B; 239/265.25, 239/265.27, 265.29, 265.31, 265.33, 265.37; 60/226.2, 228, 229, 232

[56] References Cited

U.S. PATENT DOCUMENTS 3,568,446 3/1971 Mullins et al. .............. 60/226.2
4,327,548 5/1982 Woodward .............. 239/265.33 X
4,410,152 10/1983 Kennedy et al. .............. 239/265.27 X
4,485,970 12/1984 Fournier et al. .............. 244/110 B X
4,716,724 1/1988 Newton .............. 60/226.2
4,801,112 1/1989 Fournier et al. .............. 244/110 B
4,865,256 9/1989 Durand et al. .............. 239/265.29
5,097,662 3/1992 Vieth .............. 244/110 B X

FOREIGN PATENT DOCUMENTS 0 048 669 3/1982 European Pat. Off. .
WO 96/38661 12/1996 WIPO .

*Primary Examiner*—William Grant
*Attorney, Agent, or Firm*—Young & Thompson

[57] ABSTRACT

The thrust reverser has an external cowl and a fixed engine core cowl, defining together an annular duct through which high bypass fan air is driven rearwardly. The external cowl has a section adapted to be translated between forward and rearward positions, under control of linear actuators. The translating section includes openings fitted with doors pivotally mounted on the translating section and linked to the engine core cowl so that the translating section translating movement in a rearwardly direction causes the doors to pivot from a stowed position in which they close the openings and a deployed position in which they block the annular duct. The thrust reverser includes only two such doors, the surface area occupied by each door representing more than 30% of the peripheral surface area of the inner wall of a portion of the translating section limited by the vertical planes including the upstream end of the translating section and the pivot axis of the door, respectively.

4 Claims, 6 Drawing Sheets

THRUST REVERSER FOR HIGH BYPASS FAN ENGINE

BACKGROUND OF THE INVENTION

The present invention relates to a thrust reversing system with pivoting doors, and more particularly a thrust reverser that has relatively thin external structure adapted for an aircraft with ultrahigh bypass engines.

In an ultrahigh bypass engine, the nacelle surrounding the engine must have a much larger diameter than the nacelle used in a conventional bypass engine. In addition, the ultrahigh bypass engine nacelles have a more conical shape, converging radially inwards at the aft extremity. This shape makes it difficult to adapt a conventional thrust reverser without increasing the thickness of the aft portion of the nacelle. Therefore, the thrust reverser should be installed as far forward as possible, to utilize the thicker section of the nacelle.

An object of the invention is to provide a thrust reverser of the type disclosed in EP-A1-0 281 455 but having a simpler structure.

EP-A1-0 281 455 discloses a thrust reverser having an external cowl (6) and a fixed center structure (4) (the engine core cowl), said external cowl and said engine core cowl defining together an annular duct (CA) through which high bypass fan air is driven rearwardly, said external cowl having an upstream fixed section (7) and a downstream section (8) adapted to be translated between a forward position and a rearward position, under control of a plurality of linear actuators (19), said translating section, hereafter referred to as a translating or sliding cowl, having an upstream end, a downstream end, an inner wall and an outer wall and comprising openings fitted with doors (13) pivotally mounted, around a pivot axis, on the translating cowl and linked to the engine core, so that the translating movement of the said translating cowl in a rearwardly direction causes the doors to pivot from a stowed position in which they close said openings and a deployed position in which they block said annular duct (CA) and deviate the bypass fan air outwardly forward through the openings, thus creating a reverse thrust.

In this known thrust reverser, the translating cowl is made of two half-cowls and four pivoting doors are shown, one upper door and one lower door in each half cowl. Three actuators drive each half-cowl from the stowed forward position to the deployed aft position. The upper doors are pivotally mounted on lateral (11) and upper **(11*a*) structural beams, while the lower doors are pivotally mounted on the same lateral structural beams (11) and on lower structural beams. The structural beams (11,11*a*) are substantially parallel to the centerline of the thrust reverser and they form part of the translating cowl (8). Each linear actuator (19)** is partially housed in one of said structural beams.

SUMMARY OF THE INVENTION

Compared to that disclosed in EP-A1-0 281 455, the present invention provides an improved reverser which is characterized in that it comprises two pivoting doors only, the surface area occupied by each pivoting door representing more than 30% of the peripheral surface area of the inner wall of a portion of the translating cowl, which portion is limited by the vertical plane including the upstream end of the translating cowl and the vertical plane including the pivot axis of the door.

Since the improved reverser comprises two doors only, i.e. one door only on each side of the cowl, the lateral structural beams and the actuation system within said beams are eliminated, resulting in a simpler, less complicated assembly. Four linear actuators, instead of six, are thus used.

Another type of pivoting door thrust reverser is disclosed in EP-A1-0 043 764 where three pivoting doors are attached to a sliding cowl structure. Precisely, the doors are mounted pivotally each on a fixed axis (14) connected to the upstream fixed section **(4*a*) of the external cowl (4) and the doors are linked (15) to a downstream cowl section (4*b*)** of said external cowl. It can be seen that the actuation system and door attachment design differs from that used in the present two-door thrust reverser and that the prior art three-door design is not adaptable to a ultrahigh bypass engine on an underwing aircraft installation.

In a preferred embodiment of the thrust reverser of the invention, the translating cowl is comprised of two half-cowls mounted on rails fixed to upper and lower beams. The upper beam is the main hinge beam that allows the reverser to open for engine access and removal. The lower beam provides a means for locking together the two half-cowls, sometimes referred to as C-ducts or D-ducts. Therefore, there are two upper hinge beams and two lower beams in the thrust reverser assembly.

Optionally, the present invention can also be adapted to a 360° thrust reverser configuration, i.e. a configuration in which the translating cowl is a single cowl which does not open. In this embodiment, no hinges or latches are needed.

For translating the sliding external cowl, there are four actuators, preferably, of the screw jack type that could be actuated by means of a hydraulic, pneumatic or preferably electric system for improved reliability, maintainability and reduced weight and cost. Each actuator is housed partially in the forward fixed structure and partially in the structure of the translating cowl. The actuators are protected from the fan flow temperature by an annular fan duct fairing. There are two actuators for each translating half-cowl in the C-duct configuration and each actuator is located adjacent to each beam. In the 360° configuration the four actuators are spaced in a similar way around the translating cowl periphery.

The thrust reverser according to the present invention, comprising two large pivoting doors only and a simplified actuation system and sealing, results in a lighter weight thrust reverser, easier to manufacture, with enhanced reliability. This shorter, thin lined thrust reverser provides minimal aerodynamic drag, compared to prior art conventional designs, as confirmed by aerodynamic testing and computational fluid dynamics.

BRIEF DESCRIPTION OF THE DRAWINGS

These and other advantages of the present invention will be apparent from the following detailed description and drawings, in which.

DETAILED DESCRIPTION OF THE INVENTION

Figure 1:
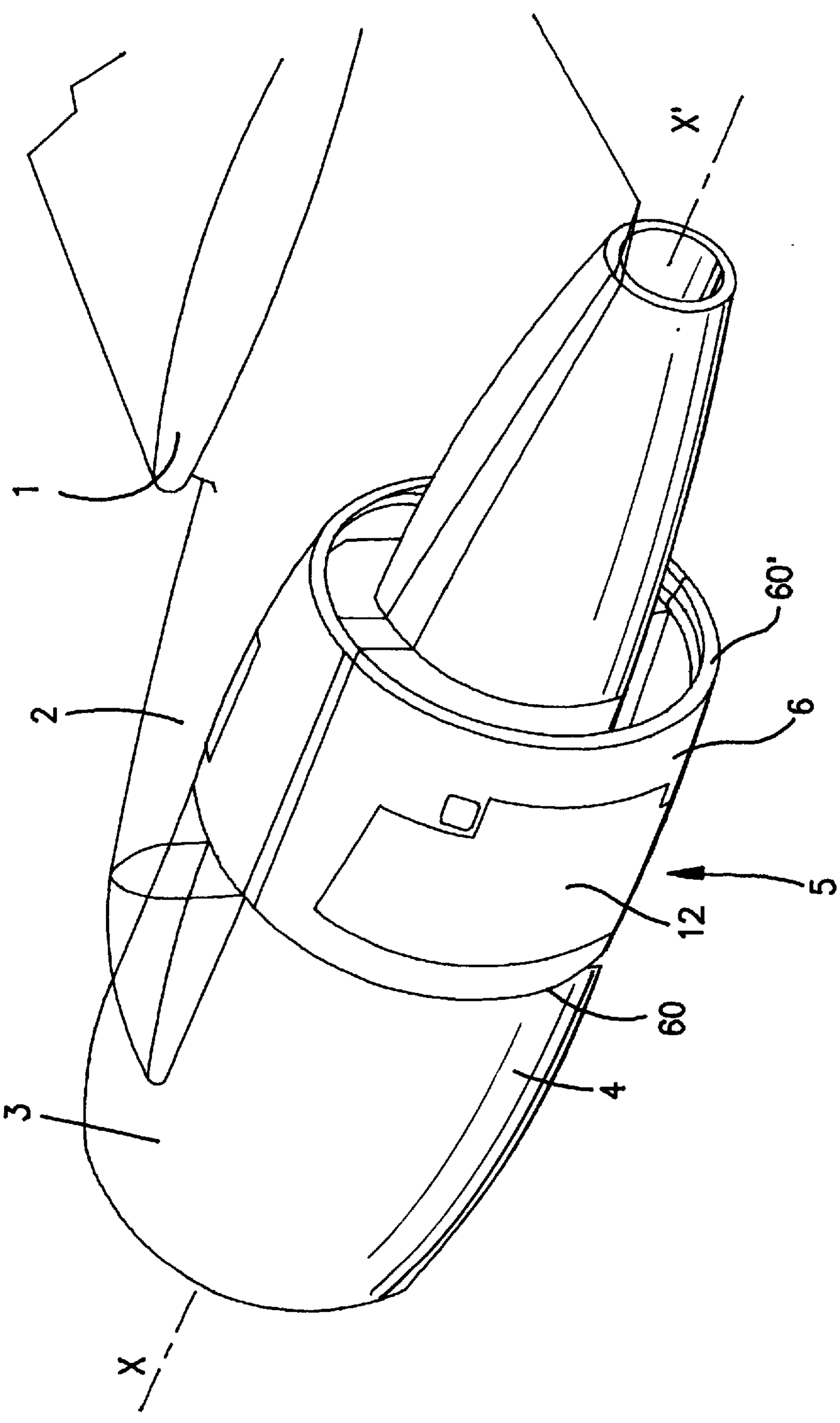
FIG. 1 and FIG. 2 are both general isometric views of the same part of an aircraft equipped with the present invention thrust reverser in the stowed position and in the deployed position, respectively.
Figure 2:
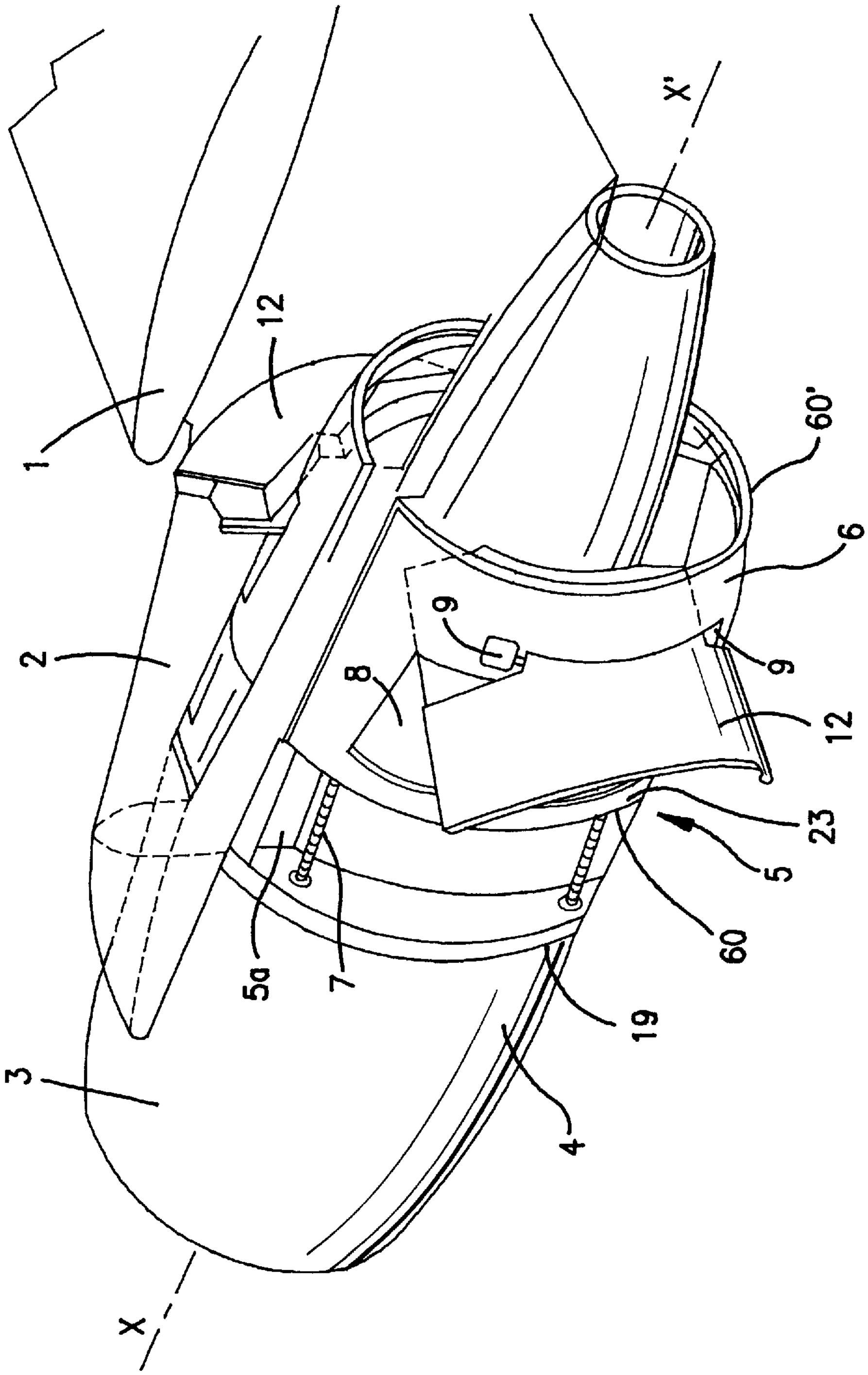
Figure 5:
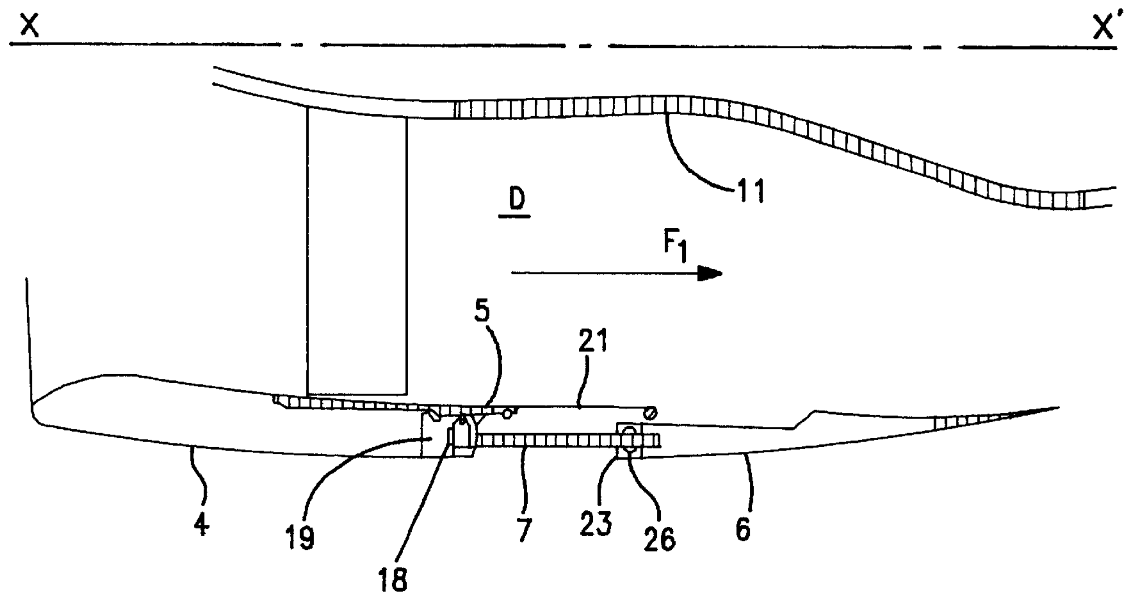
FIG. 5 is a cross section taken in a vertical plane containing the axis X–X' of the thrust reverser shown in the stowed position, said cross section illustrating the actuation system for driving the sliding cowl from the stowed position to the deployed position.
Figure 6:
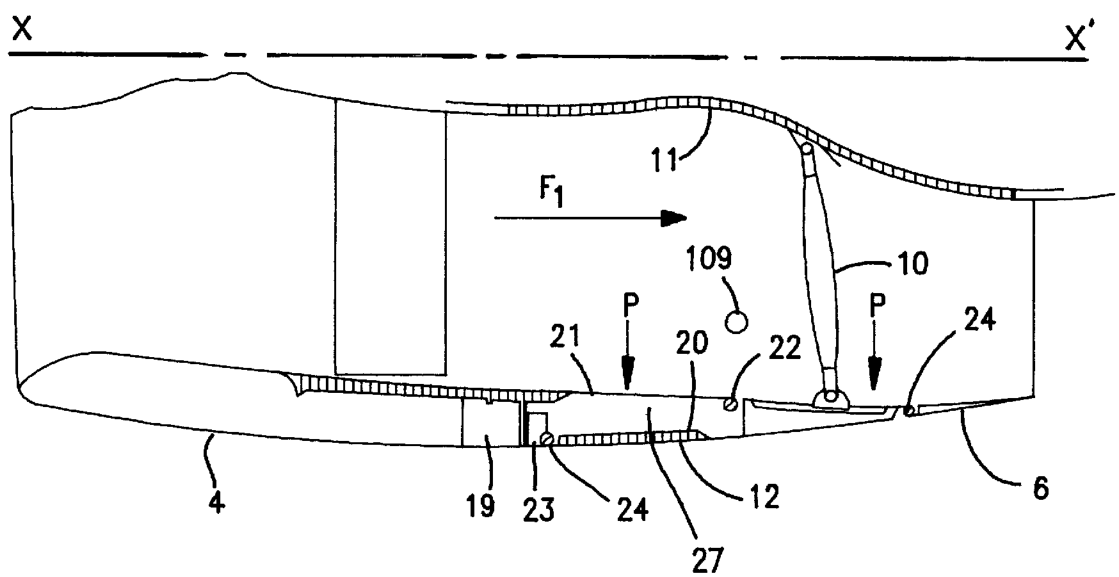
FIG. 6 is the same cross section as FIG. 5, but illustrating the door pivot axis, door seals and pressure balance distribution of the fan duct pressure on the door surface.

In the present description and in the claims, the expression forward (or upstream) and rearward (or aft or downstream) are used by reference to the normal gas flow direction $F_1$ illustrated in FIGS. 5 and 6. Referring to FIGS. 1 and 2, there is seen a part of an aircraft having a wing 1, under which is fixed, by means of a pylon 2, a nacelle 3 comprised of a forward fixed structure 4 and of an aft structure 5. The aft portion of the forward fixed structure 4 and the aft structure 5 define together a thrust reverser. An ultrahigh bypass engine, not shown, is surrounded by the nacelle 3. The thrust reverser comprises a fixed structure 5*a* and an external cowl 6 adapted to translate between a stowed and locked position represented in FIG. 1 and a deployed aft position represented in FIG. 2, said translation being controlled by four linear actuators 7. The system driving these actuators can be electric, hydraulic or pneumatic. A frame structure 19 is permanently attached to the thrust reverser fixed structure 5*a* and to the aft end of the nacelle forward structure 4, and the forward end of the translating cowl 6 is provided with a structural frame 23.

Figure 3A:
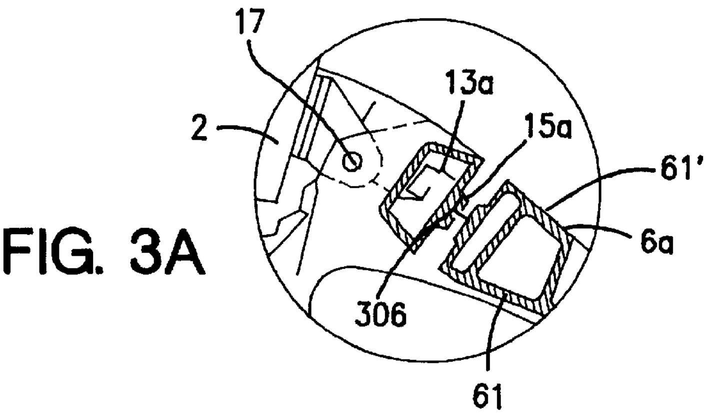
FIG. 3A is an enlarged detail of FIG. 3.

The external cowl 6, referred to as translating or sliding cowl, has an upstream end 60, a downstream end 60', an inner wall 61 (see FIG. 3A) and an outer wall 61' (see FIG. 3A). The external cowl 6 is provided with two openings or pits 8 with a pivoting door 12 installed in each opening 8. Each door 12 is adapted to pivot between a closed or stowed position (FIG. 1) and an open or deployed position (FIG. 2). More precisely each door 12 pivots around two pivot bearings 9 provided in the translating cowl structure. The surface area occupied by each pivoting door 12 represents more than 30% of the peripheral surface area of the inner wall 61 of the portion of the translating cowl 6, which is limited by the vertical plane including the upstream end 60 of the translating cowl and the vertical plane including the pivot axis 109 (FIGS. 3 or 4) virtually linking the bearings 9 around which the door pivots. In other words, doors 12 are large doors.

Figure 3:
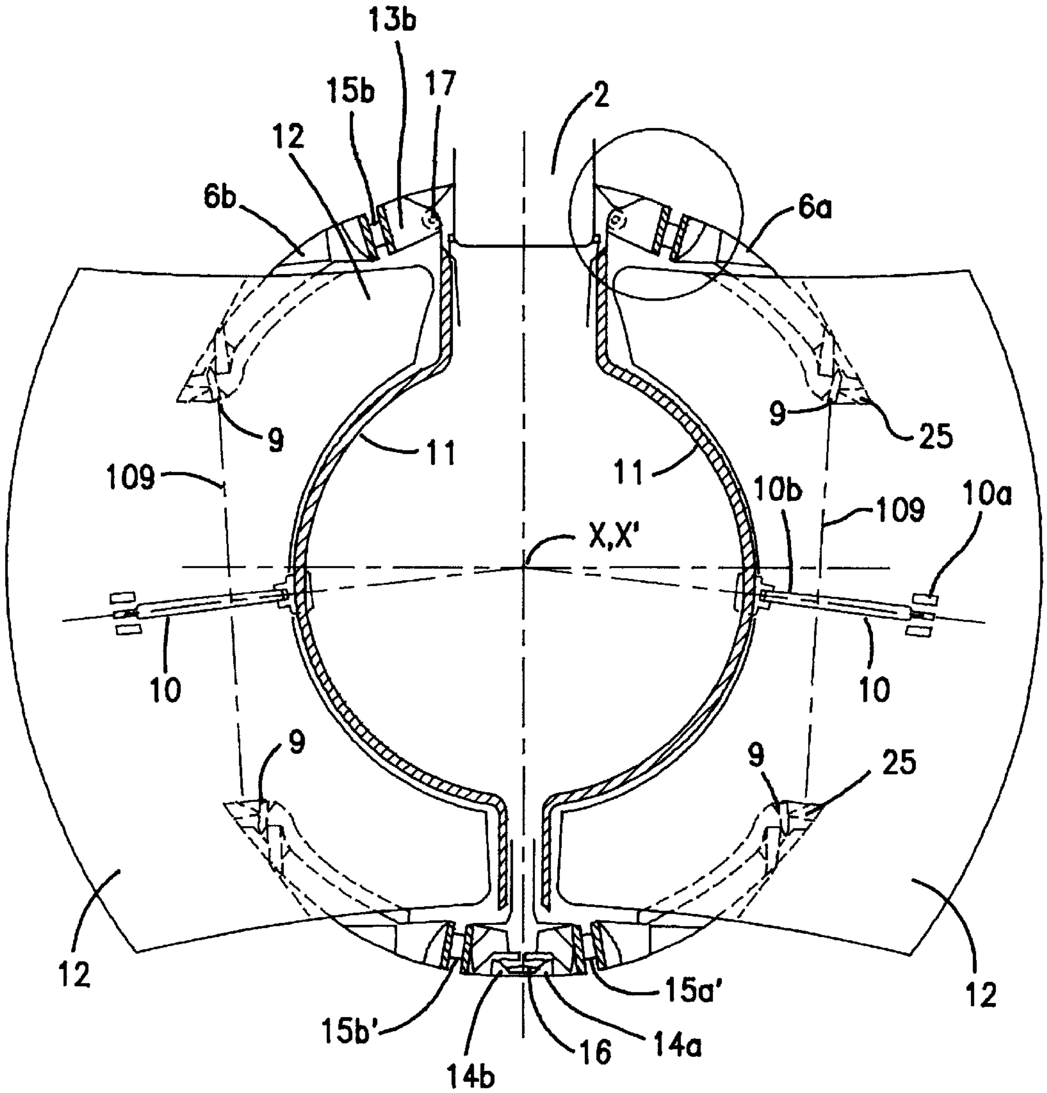
FIG. 3 is a cross section taken in a vertical plane perpendicular to the axis X–X' of the thrust reverser of FIGS. 1 and 2, said cross section looking forward and showing the pivoting doors deployed for a C-duct type installation.

Referring now to FIGS. 3 and 3A, there is shown a thrust reverser configuration of the C-duct type, i.e. a configuration in which the translating cowl 6 is split into two halves 6*a*,6*b*, referred to as C-ducts, permitting the opening thereof and thus the access to the engine. Hinges 17 are provided on the pylon 2 to permit opening and closing of the C-ducts 6*a*,6*b* and latches 16 are provided to lock the two C-ducts 6*a*,6*b* together when closed.

In FIG. 3, the thrust reverser is shown deployed, with its pivoting doors 12 opened, thereby blocking the fan duct D defined between a fan duct fairing 21 (see FIGS. 5–8) and the inner wall of the engine core cowl 11. One can see that drag links 10 are attached, in 10*a*, to the center of the pivoting doors 12 and, in 10*b*, to a fixed center structure 11, referred to as the engine core cowl The C-duct 6*a* is slidably mounted on an upper beam 13*a* and a lower beam 14*a*. For this purpose, the C-duct 6*a* is provided with rollers 306 which engage a rail 15*a*, 15*a'* respectively. The same applies to C-duct 6*b* which is slidably mounted on an upper beam 13*b* and a lower beam 14*b*, through engagement of rollers into rails 15*b*, 15*b'* respectively.

Owing to this structure, when the sliding cowl 6 is translated rearwardly under control of the actuators 7, the drags links 10 pull the doors 12 open, said doors pivoting in the pivot bearings 9.

Figure 4:
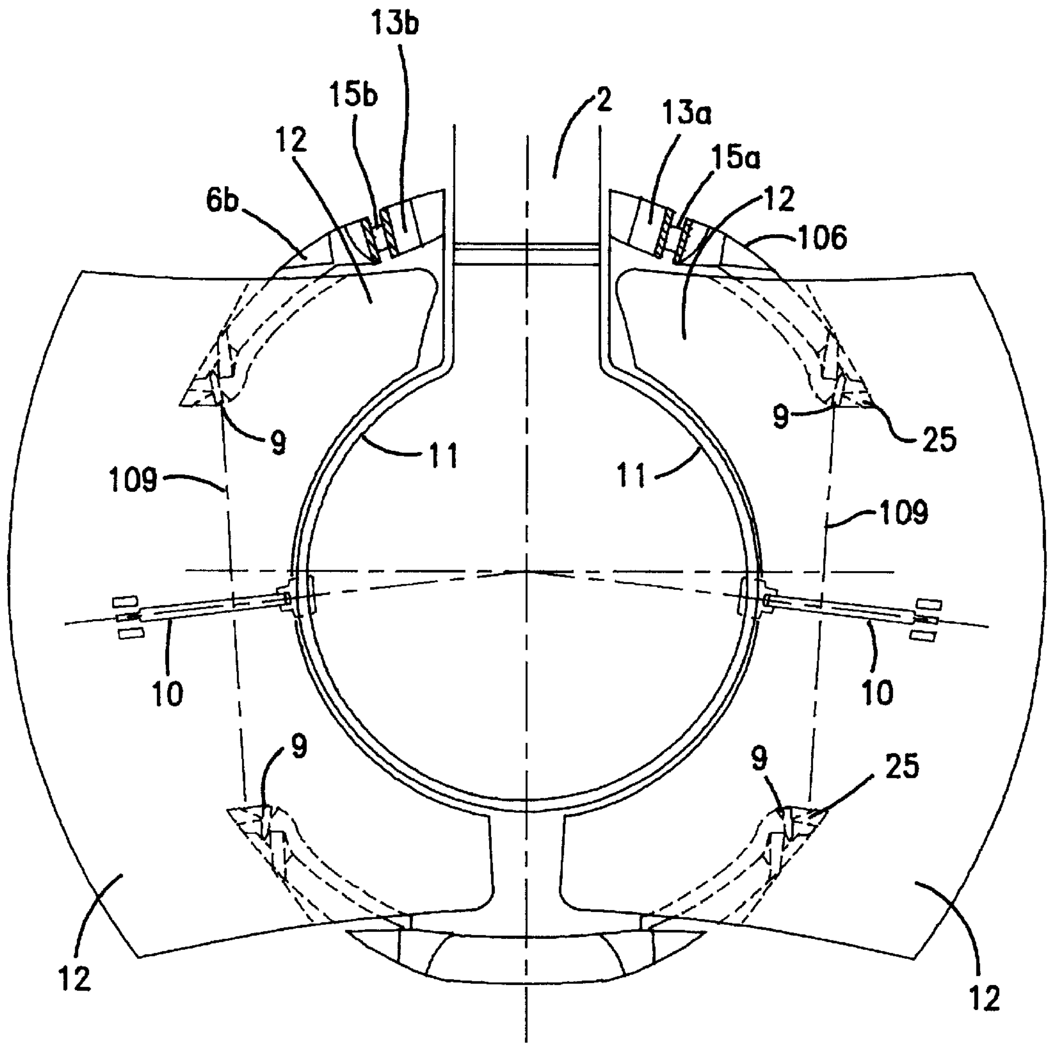
FIG. 4 is the same cross section as FIG. 3, but for a 360° type installation.

An optional thrust reverser configuration is shown in FIG. 4. This type is referred to as a 360° installation since it includes a single annular thrust reverser cowl 106 instead of a cowl split into two halves. Such a 360° cowl does not open. With large diameter nacelles this is an acceptable installation since access to the engine can be accomplished through the large space in the duct. It should be noted that the present invention is suitable for both the C-duct concept and the 360° concept. The only difference to be noted is that the 360° concept does not require the hinges 17, the latches 16 nor the rails 15*a'*, 15*b'* installed on the lower beam 14. The translating cowl 106 which is a continuous hoop, is entirely supported by the upper beams 13*a*, 13*b* as mentioned above, i.e. through engagement of rollers provided on said cowl 106 into rails provided on the beams.

The translating movement of the sliding cowl 6 in the C-duct configuration or 106 in the 360° configuration is controlled, as already mentioned, by four linear actuators 7.

As shown in FIG. 5, each linear actuator 7 is connected to the translating cowl 6 by means of a nut type assembly 26.

The forward end of the said actuator 7, referred to as the head 18 is attached to and housed in the frame structure 19.

Figure 7:
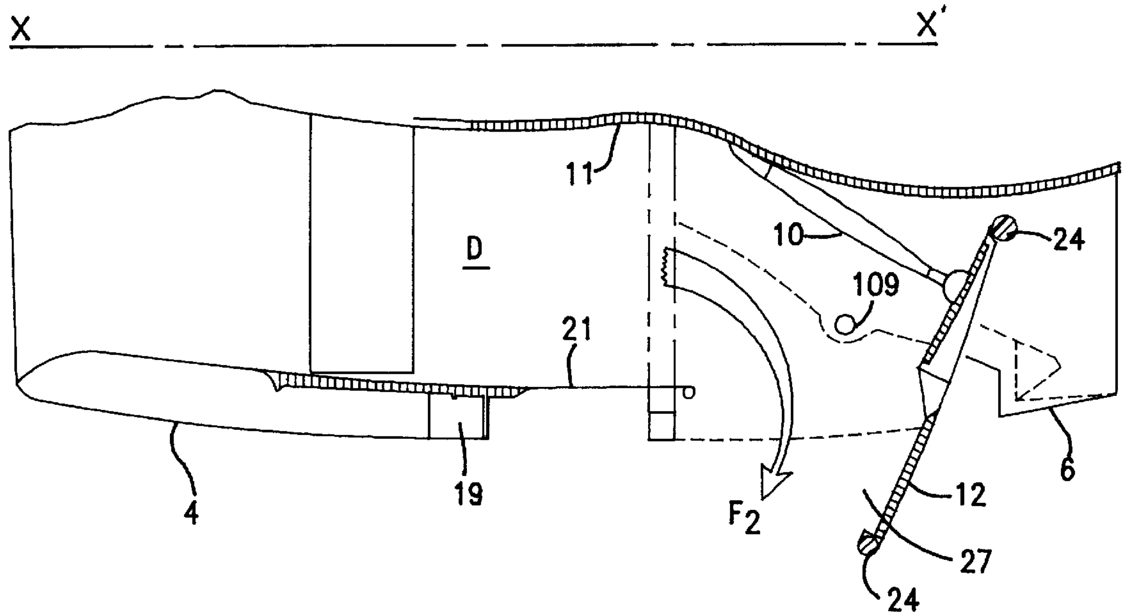
FIG. 7 is the same cross section as FIG. 6, but showing the thrust reverser in the deployed position.
Figure 8:
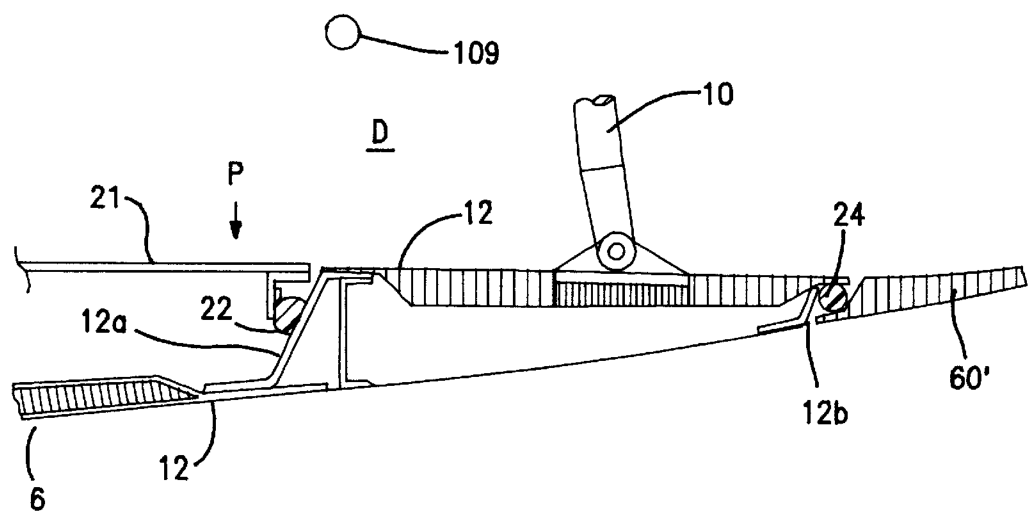
FIG. 8 is an enlarged part of the cross section of FIG. 6 showing specific details of the seals.

In FIGS. 6, 7 and 8 it is seen that the pivoting door 12 is hinged around a virtual axis 109 which lays between the two pivot bearing 9 housed, as detailed in FIG. 3 and FIG. 4, in the structural beams 25 of the sliding cowl 6*a* or 106.

The design, as shown, requires a small load to translate the translating cowl 6 from a stowed to a deployed position. This is basically due to a pressure balanced load on the pivoting doors 12. Therefore the linear actuators 7 can be electrically operated. Industry studies are now showing that an electric system will offer improved engine control reliability and maintainability with reduced weight and cost, compared to hydraulic mechanical systems.

Coming back to the pivot axis 109, it can be seen (FIG. 6) that, in the stowed position, the fan duct pressure P is applying a pressure load on the aft part of the pivoting door 12 thereby creating a moment to keep the door closed or stowed. This feature offers the benefit of assurance that there cannot be an inflight deployment of the pivoting doors 12. A seal 22 (see FIG. 8) prevents the fan flow pressure P from exerting a pressure load on the forward structure 20 of the pivoting door 12. It can also be seen in FIGS. 6 and 8 that the fan duct fairing 21 also protects the forward structure 20 of the pivoting door from the fan duct pressure P.

FIG. 7 shows the translating cowl 6 translated aft and the pivoting door 12 deployed so that it blocks the fan duct D and projects the fan air flow $F_2$ in an outwardly forward direction. The forward structure frame 23 of translating cowl 6 is shown in the translated position as well as the pivot axis 109. It can also be seen in FIG. 7 that the pivoting door forward structure 20 has a deep recess 27 to provide maximum reverse thrust performance. Wind tunnel and flight testing have shown that a recessed pivoting door structure will increase the reverse thrust efficiency and the reverser thrust coefficient. Such a deep recess 27 in the door forward structure 20 is permitted by the fact that, in the stowed position, the fan duct fairing 21 overlaps the door forward structure 20 and thus closes the recess 27, as shown in FIG. 6, so that the presence of the recess 27 does not interrupt the continuity of the internal wall of the fan air duct in the stowed position. Such overlapping is thus an important feature of the invention.

It can be seen in FIG. 8 that the fan duct D has no large gaps or cavities between the structures which define it. The seal 22 closes the gap between the inner surface 12*a* of the door 12 and the fairing 21, and a bulbed seal 24 closes the gap between the aft part 12*b* of the door 12 and the aft part 60' of the translating cowl 6.

It can be seen in FIG. 7 that the bulbed seal 24 is attached to the pivoting door and makes a sealing contact against the structure of the translating cowl 6. It can also be seen in FIGS. 6 and 7 that the bulbed seal 24 is installed around the entire periphery of the pivoting door 12. For performance of the aircraft, these sealing features result in very little forward thrust loss, thereby providing an economical benefit.

What I claim is:

1. A thrust reverser having an external cowl and a fixed center engine core cowl, said external cowl and said engine core cowl defining together an annular duct through which high bypass fan air is driven rearwardly, said external cowl having an upstream fixed section and a downstream section adapted to be translated between a forward position and a rearward position, under control of a plurality of linear actuators, said translating section thus forming a translating cowl having an upstream end, a downstream end, an inner wall and an outer wall and comprising openings fitted with doors pivotally mounted, around a pivot axis, on the translating cowl and linked to said engine core cowl so that the translating movement of the said translating cowl in a rearwardly direction causes the doors to pivot from a stowed position in which they close said openings and a deployed position in which they block said annular duct and deviate the bypass fan air outwardly through the openings, thus creating a reverse thrust, wherein the thrust reverser includes one of said pivoting doors in each half of said translating cowl, the surface area occupied by each of said pivoting doors representing more than 30% of the peripheral surface area of an inner wall of a portion of the translating cowl, which portion is limited by a vertical plane including the upstream end of the translating cowl and a vertical plane including the pivot axis of the door, and wherein said doors are each mounted on two pivot bearings that are respectively installed on a circumferential beam of said translating cowl.

2. The thrust reverser of claim 1 in which each pivoting door defines a recess in its forward structure to provide maximum reverse thrust performance, wherein said thrust reverser includes an annular fan duct fairing which protects said linear actuators from the fan flow temperature and wherein, in the door stowed position, the annular fan duct fairing overlaps said recess, thus securing the continuity of the inner wall of the fan duct.

3. The thrust reverser of claim 1, wherein each of said doors blocks a different semicircular portion of the annular duct when said translating cowl is in the deployed position in order to deflect air that is being driven through the semicircular portion of the annular duct out a respective one of said openings.

4. A thrust reverser for an aircraft engine having an external cowling and an engine core cowling that together define a generally annular duct through which high bypass fan air is driven, the thrust reverser comprising:

a translating cowling that forms a downstream section of the external cowling, said translating cowling being movable between a stowed position and a deployed position and having two openings, one in each generally semicircular portion of said translating cowling; and two pivoting doors, each of said doors for closing one of said openings when said translating cowling is in the stowed position and for substantially closing a different semicircular portion of the annular duct when said translating cowling is in the deployed position in order to deflect air that is being driven through the semicircular portion of the annular duct out a respective one of said openings.

* * * * *